United States Patent
Hui et al.

(10) Patent No.: US 9,804,634 B2
(45) Date of Patent: Oct. 31, 2017

(54) PERIPHERAL INTERFACE CIRCUIT AT HOST SIDE AND ELECTRONIC SYSTEM USING THE SAME

(71) Applicant: VIA Alliance Semiconductor Co., Ltd., Shanghai (CN)

(72) Inventors: Zhiqiang Hui, Beijing (CN); Lingyan Zhong, Beijing (CN); Yunxing Dong, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 355 days.

(21) Appl. No.: 14/589,189

(22) Filed: Jan. 5, 2015

(65) Prior Publication Data

US 2016/0161980 A1 Jun. 9, 2016

(30) Foreign Application Priority Data

Dec. 3, 2014 (CN) .......................... 2014 1 0727086

(51) Int. Cl.
*G06F 13/42* (2006.01)
*G06F 1/12* (2006.01)

(52) U.S. Cl.
CPC ............ *G06F 1/12* (2013.01); *G06F 13/4226* (2013.01); *G06F 13/4291* (2013.01)

(58) Field of Classification Search
None
See application file for complete search history.

(56) References Cited

U.S. PATENT DOCUMENTS

| 6,646,929 B1* | 11/2003 | Moss .................. G06F 13/4243 365/193 |
| 6,658,073 B1* | 12/2003 | Grunert .................. H04L 1/205 375/354 |
| 8,008,961 B2 | 8/2011 | Garg et al. |
| 8,407,508 B2 | 3/2013 | Lee et al. |

(Continued)

FOREIGN PATENT DOCUMENTS

| CN | 102279801 A | 12/2011 |
| CN | 102714492 A | 10/2012 |

(Continued)

OTHER PUBLICATIONS

Chinese language office action dated Jan. 11, 2017, issued in application No. CN 201410747619.9.

*Primary Examiner* — Cheng-Yuan Tseng (74) *Attorney, Agent, or Firm* — McClure, Qualey & Rodack, LLP (57) ABSTRACT

A peripheral interface circuit at host side and an electronic system using the same is disclosed. The peripheral interface circuit has a bus clock signal generator and a data register. The bus clock signal generator outputs a bus clock signal based on a host clock signal to be conveyed to a peripheral device via an interface bus as a reference for the peripheral device to output data. The data register receives the data output from the peripheral device and retrieved at the host side in accordance with the host clock signal. The bus clock signal generator adjusts the bus clock signal based on how the host clock signal is phase-asynchronous to the data output from the peripheral device and retrieved at the host side in accordance with the host clock signal.

20 Claims, 7 Drawing Sheets

(56) References Cited

U.S. PATENT DOCUMENTS

| | | |
|---|---|---|
| 9,070,420 B2 | 6/2015 | Wei et al. |
| 2012/0179847 A1 | 7/2012 | Berenbaum |
| 2014/0208149 A1 | 7/2014 | Canac et al. |

FOREIGN PATENT DOCUMENTS

| | | |
|---|---|---|
| TW | 201201021 | 1/2012 |
| TW | 201205297 | 2/2012 |
| TW | 201239638 | 10/2012 |
| TW | 201430578 | 8/2014 |

\* cited by examiner

PERIPHERAL INTERFACE CIRCUIT AT HOST SIDE AND ELECTRONIC SYSTEM USING THE SAME

CROSS REFERENCE TO RELATED APPLICATIONS

This application claims priority of China Patent Application No. 201410727086.8, filed on Dec. 3, 2014, the entirety of which is incorporated by reference herein.

BACKGROUND OF THE INVENTION

Field of the Invention

The present invention relates to a communication interface between host and peripheral device, and particularly it relates to signal synchronization in the communication interface.

Description of the Related Art

Signal synchronization is an important issue in the communication between a host and a peripheral device.

One conventional technique uses two separate paths to generate a host clock signal and a bus clock signal, both based on a source clock signal that is generally provided from an oscillator on a motherboard. The host operates according to the host clock signal. A peripheral device coupled to the host via an interface bus operates according to the bus clock signal. An additional phase-locked loop is required in the path generating the bus clock signal and a complex clock path analysis has to be performed to properly generate the host clock signal and the bus clock signal to make the host and the peripheral device communicate smoothly via the interface bus.

BRIEF SUMMARY OF THE INVENTION

In this disclosure, the host provides the peripheral device with a bus clock signal.

A peripheral interface circuit at host side in accordance with an exemplary embodiment of the disclosure comprises a bus clock signal generator and a data register. The bus clock signal generator generates a bus clock signal based on a host clock signal to be conveyed to a peripheral device via an interface bus as a reference for the peripheral device to output data. The data output from the peripheral device and retrieved at the host side in accordance with the host clock signal is pushed into the data register for temporary storage. Based on how the host clock signal is phase-asynchronous to the data output from the peripheral device and retrieved at the host side in accordance with the host clock signal (e.g. a phase difference therebetween), the bus clock generator adjusts the bus clock signal and thereby improves accuracy of the data in the data register.

An electronic system in accordance with an exemplary embodiment of the disclosure comprises a host and a phase shift control module. The host has a bus clock signal generator and data register. The bus clock signal generator generates a bus clock signal based on a host clock signal to be conveyed to a peripheral device via an interface bus as a reference for the peripheral device to output data. The data output from the peripheral device and retrieved at the host side in accordance with the host clock signal is pushed into the data register for temporary storage. Based on how the host clock signal is phase-asynchronous to the data output from the peripheral device and retrieved at the host side in accordance with the host clock signal, the bus clock generator adjusts the bus clock signal and thereby improves the accuracy of the data in the data register. The phase shift control module is operative to generate a phase shift control signal for the bus clock signal generator to adjust the bus clock signal.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
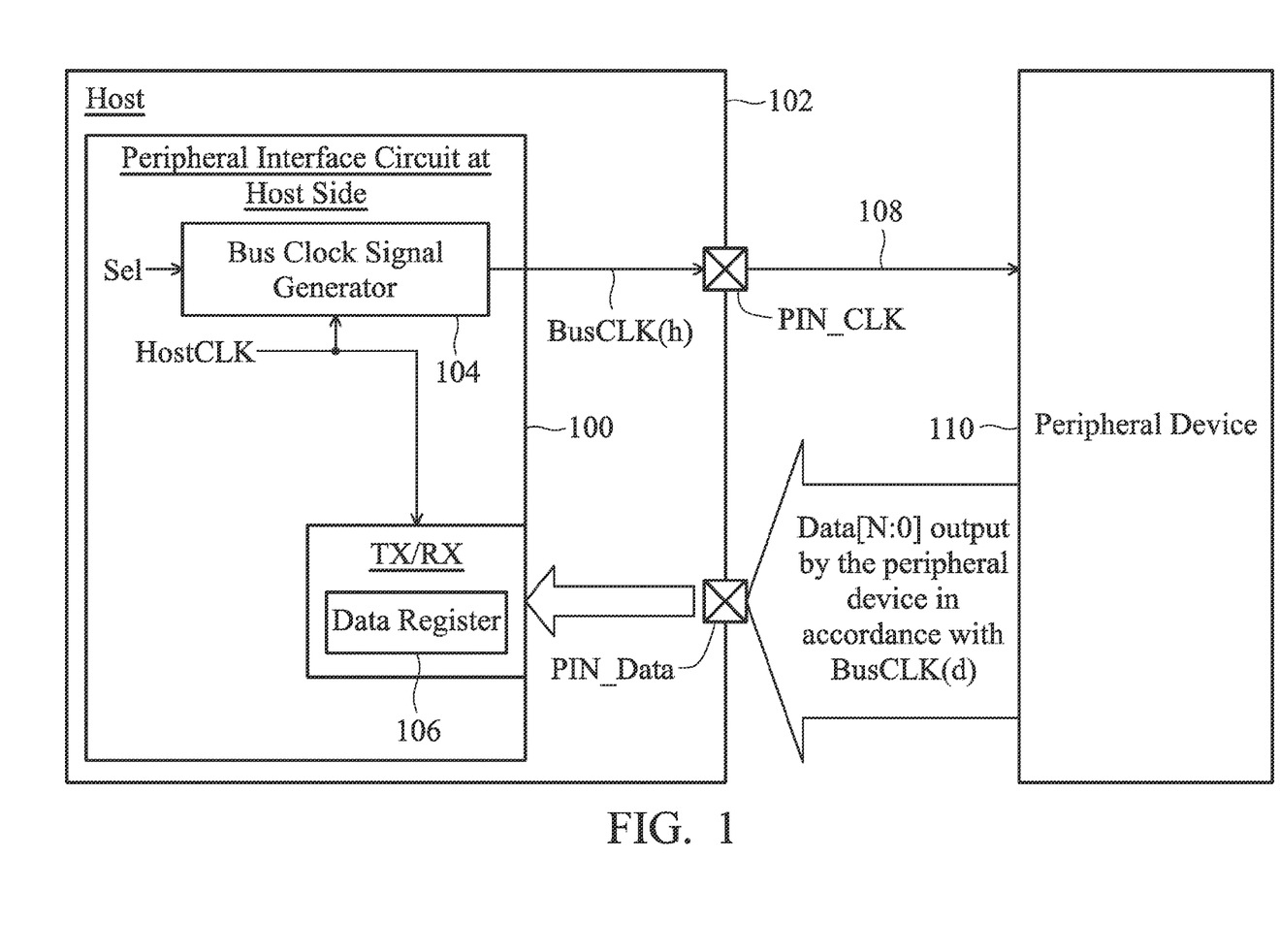
FIG. 1 depicts a peripheral interface circuit 100 at host side in accordance with an exemplary embodiment of the disclosure and further shows a host 102 having the peripheral interface circuit 100.

FIG. 1 depicts a peripheral interface circuit 100 at host side in accordance with an exemplary embodiment of the disclosure. It also depicts the host 102 having the peripheral interface circuit 100. The host 102 may be a chipset.

In addition to the peripheral interface circuit 100, the host 102 further has a clock pin PIN_CLK and a data pin PIN_Data.

The peripheral interface circuit 100 at host side includes a bus clock signal generator 104 and a data register 106. The bus clock signal generator 104 outputs a bus clock signal BusCLK(h) based on a host clock signal HostCLK to be transmitted to an interface bus 108 via the clock pin PIN_CLK and conveyed by the interface bus 108 to be received by a peripheral device 110 as a reference for the peripheral device 110 to output data Data[N:0]. The data register 106 is operative to receive the data Data[N:0] output from the peripheral device 110 and retrieved at host side in accordance with the host clock signal HostCLK. In an exemplary embodiment, the bus clock signal BusCLK(h) may be delayed by the circuit traces in the host 102, the transmission of the interface bus 108 and the circuit traces in the peripheral device 110 and should be relabeled as BusCLK(d). The peripheral device 110, in fact, outputs the data Data[N:0] in accordance with the bus clock signal BusCLK(d), and the data Data[N:0] is received by the host 102 via the data pin PIN_Data and sent to the transceiver module TX/RX of the peripheral interface circuit 100 at host side. The transceiver module TX/RX uses the host clock signal HostCLK to retrieve the data Data[N:0] from the peripheral device 110 and pushes the data Data[N:0] into the data register 106 for temporary storage. There is a delay from the peripheral device 110 receiving the bus clock signal BusCLK(d) to the peripheral device 110 outputting the data Data[N:0]. In cases where the interface bus 108 is an LPC (Low Pin Count) bus, it is required in the LPC specification that an output valid time, which is the delay from the LPC peripheral device receiving a first rising edge of the bus clock signal to the LPC peripheral device stably outputting data, should be less than 12 ns. Furthermore, there also may be a phase delay of the data Data[N:0] on its transmission path from the peripheral device 110 to the interface bus and to the data register 106 of the transceiver module TX/RX. Based on how the host clock signal HostCLK is asynchronous to the data Data[N:0] output from the peripheral device 110 and retrieved at host side in accordance with the host clock signal HostCLK, the bus clock signal generator 104 adjusts the bus clock signal BusCLK(h) and thereby to make the data in the data register 106 accurate. The asynchronous phase of host clock signal HostCLK and data Data[N:0] may be due to: the transmission delay of the bus clock signal BusCLK(h) from the bus clock signal generator 104 to the interface bus 108 and to the peripheral device 110 (the transmission delay of the bus clock signal BusCLK(h) may further include a delay due to the circuit traces at the host 102 side and the circuit traces at the peripheral device 110 side for the bus clock signal), a delay from the peripheral device 110 receiving the bus clock signal to the peripheral device 110 outputting the data Data[N:0], and a delay on the interface bus 108 for the transmission of the data Data[N:0].

In an exemplary embodiment, the bus clock signal generator 104 adjusts the bus clock signal BusCLK(h) to make the data register 106 to receive the data Data[N:0], output from the peripheral device 110 and retrieved at host side in accordance with the host clock signal HostCLK, within one clock cycle of the host clock signal HostCLK. When the interface bus 108 is an LPC (Low Pin Count) bus, an SPI (Serial Peripheral Interface) bus, or a flash memory (e.g. SM or SD card) bus that operates at low frequency and conveys digital signals, it is requested that the data register 106 receives the data Data[N:0] within one cycle time after the host clock signal HostCLK is triggered, to reduce the time delay and to improve the data throughput.

In another exemplary embodiment, the bus clock signal generator 104 shifts the phase of the bus clock signal BusCLK(h) to be earlier than the phase of the host clock signal HostCLk. In another exemplary embodiment, a phase shift control signal Sel is required to control a phase shift between the bus clock signal BusCLK(h) and the host clock signal HostCLK. The bus clock signal BusCLK(h) may be controlled at the same phase with the host clock signal HostCLK, or leading the host clock signal HostCLK by one of multiple phase shift choices.

Figure 2A:
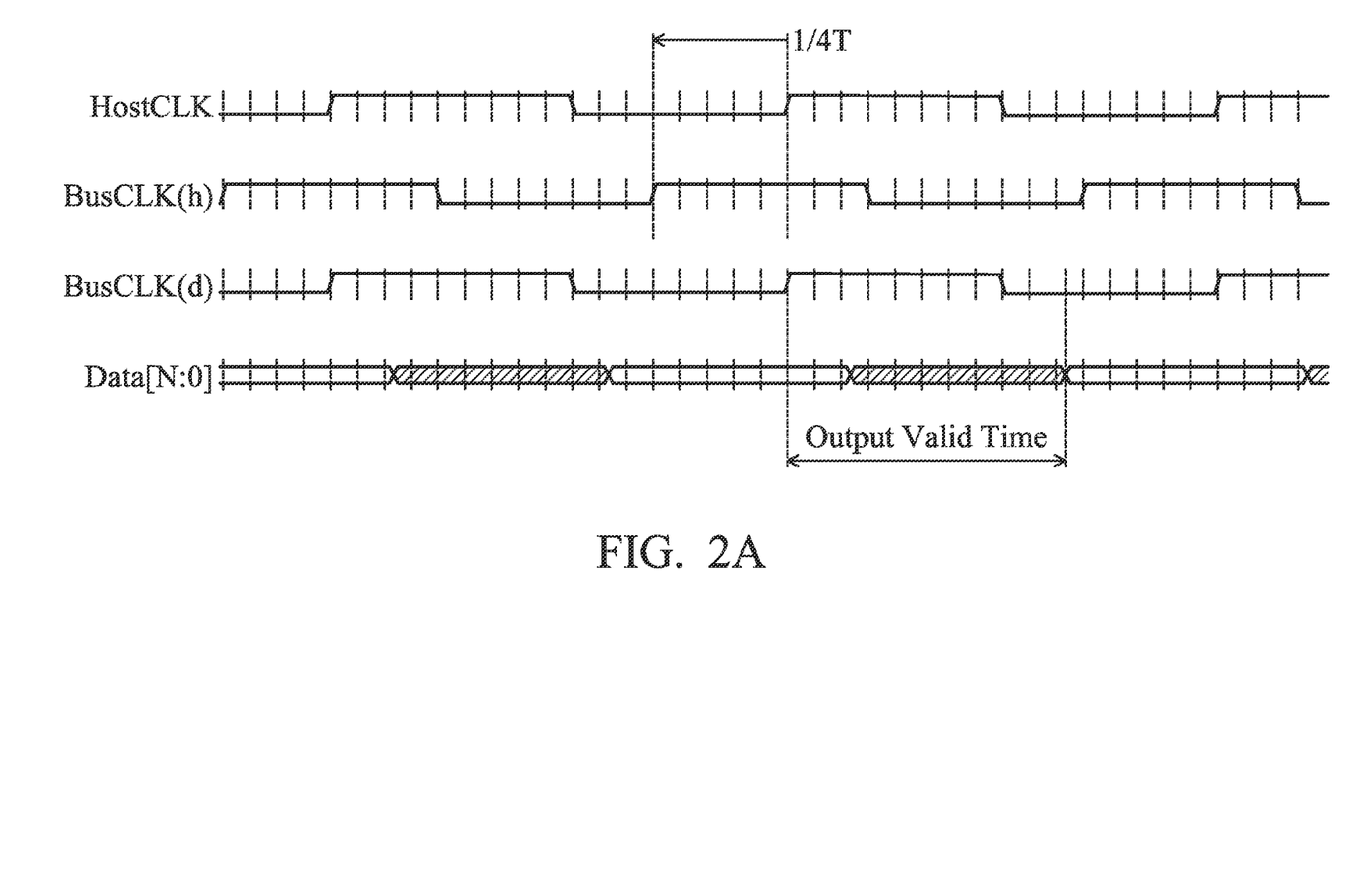
FIG. 2A and FIG. 2B are waveform diagrams corresponding to two exemplary embodiments of the disclosure.

FIG. 2A is a waveform diagram showing that the bus clock signal BusCLK(h) leads the host clock signal HostCLK by one quarter of a clock cycle and thereby the data Data[N:0] that is output according to the bus clock signal BusCLK(d) at the peripheral device 110 side is accurately retrieved in accordance with the host clock signal HostCLK at the host 102 side. For a host clock signal HostCLK oscillates at 30 ns cycle time (i.e. 33 MHz), a transmission delay, 35 ns, is estimated from a clock tree synthesis (CTS).

The transmission delay may result in the aforementioned asynchronous phenomenon and may be due to: a delay from the peripheral interface circuit 100 outputting the bus clock signal BusCLK(h) to the peripheral device 110 receiving the bus clock signal BusCLK(d) which is 13 ns; a delay caused by the output valid time of the data Data[N:0] (wherein the dark area shows the unstable data) which is 12 ns; and a trace delay for transmission of the data Data[N:0] which is 10 ns. Thus, it is impossible to get the data Data[N:0] within one clock cycle time (30 ns) after the host clock single HostCLK is triggered if the bus clock signal generator 104 outputs the host clock signal HostCLK as the bus clock signal BusCLK (h) for the peripheral device 110 to output the data Data[N: 0]. In the exemplary embodiment of FIG. 2A, the bus clock signal BusCLK(h) is triggered one quarter of a clock cycle (7.5 ns) earlier than the host clock signal HostCLK, and thereby the data register 106 receives the data Data[N:0] in 27.5 ns after the host clock signal HostCLK is triggered, to meet the requirements for receiving the data Data[N:0] (within 30 ns).

Figure 2B:
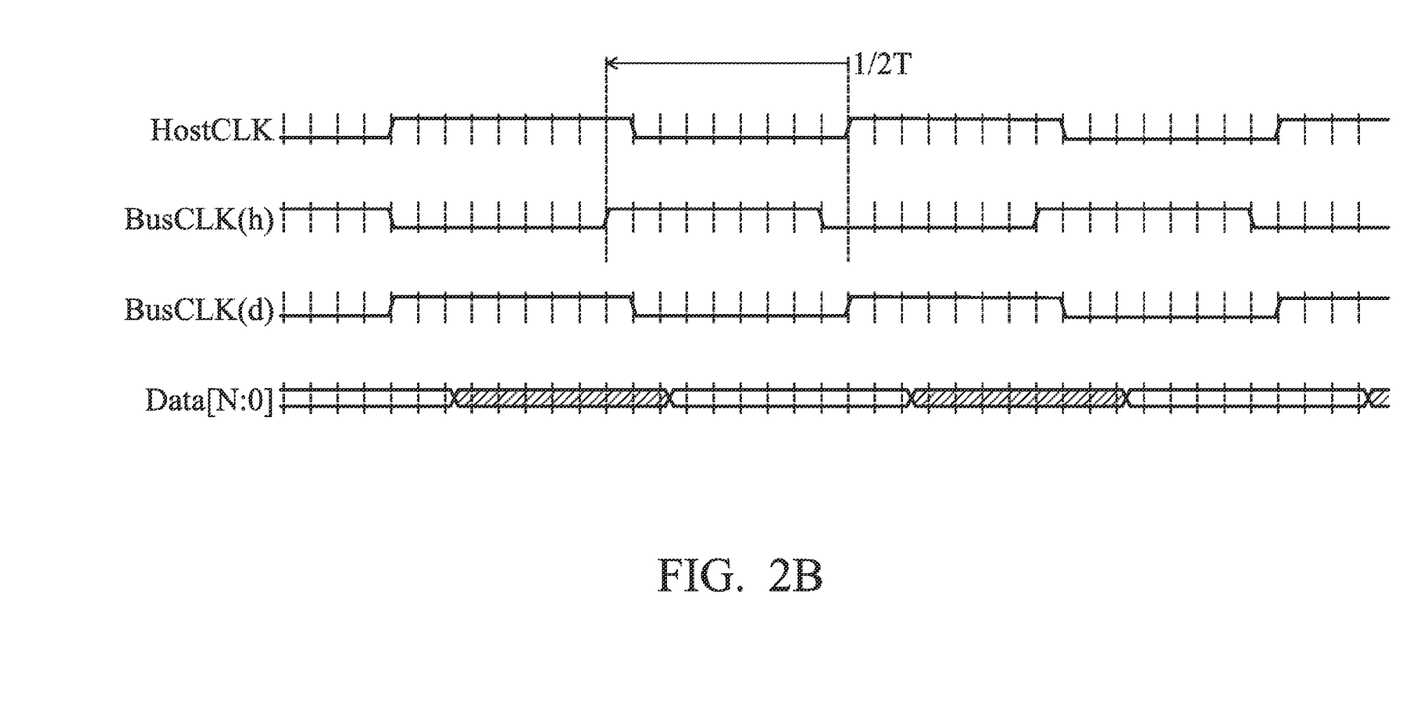

FIG. 2B is a waveform diagram showing that the bus clock signal BusCLK(h) leads the host clock signal HostCLK by half a clock cycle and thereby the data Data[N:0] that is output according to the bus clock signal BusCLK(d) at the peripheral device 110 side is accurately retrieved in accordance with the host clock signal HostCLK at the host 102 side.

FIG. 2A and FIG. 2B showing that the bus clock signal BusCLK(h) leading the host clock signal HostCLK by one quarter clock cycle or half a clock cycle are exemplary embodiments only, and are not intended to limit the invention. The bus clock signal generator 104 may select the bus clock signal BusCLK(h) from the host clock signal HostCLK and a plurality of phase-shifted clock signals, each of which has a respective phase shift with the host clock signal HostCLK. The phase-shifted clock signals include the first phase-shifted clock signal leading the host clock signal HostCLK by 1/N clock cycle, the second phase-shifted clock signal leading the host clock signal HostCLK by 2/N clock cycle, the third phase-shifted clock signal leading the host clock signal HostCLK by 3/N clock cycle and so on. The $(N-1)_{th}$ phase-shifted clock signal leading the host clock signal HostCLK by (N−1)/N clock cycle. N equals $2^n$, where n is a natural number.

Techniques about generating the host clock signal HostCLK and the bus clock signal BusCLK(h) are discussed in the following paragraphs, wherein N is set to 4 for example, but this is not intended to limit the invention.

Figure 3A:
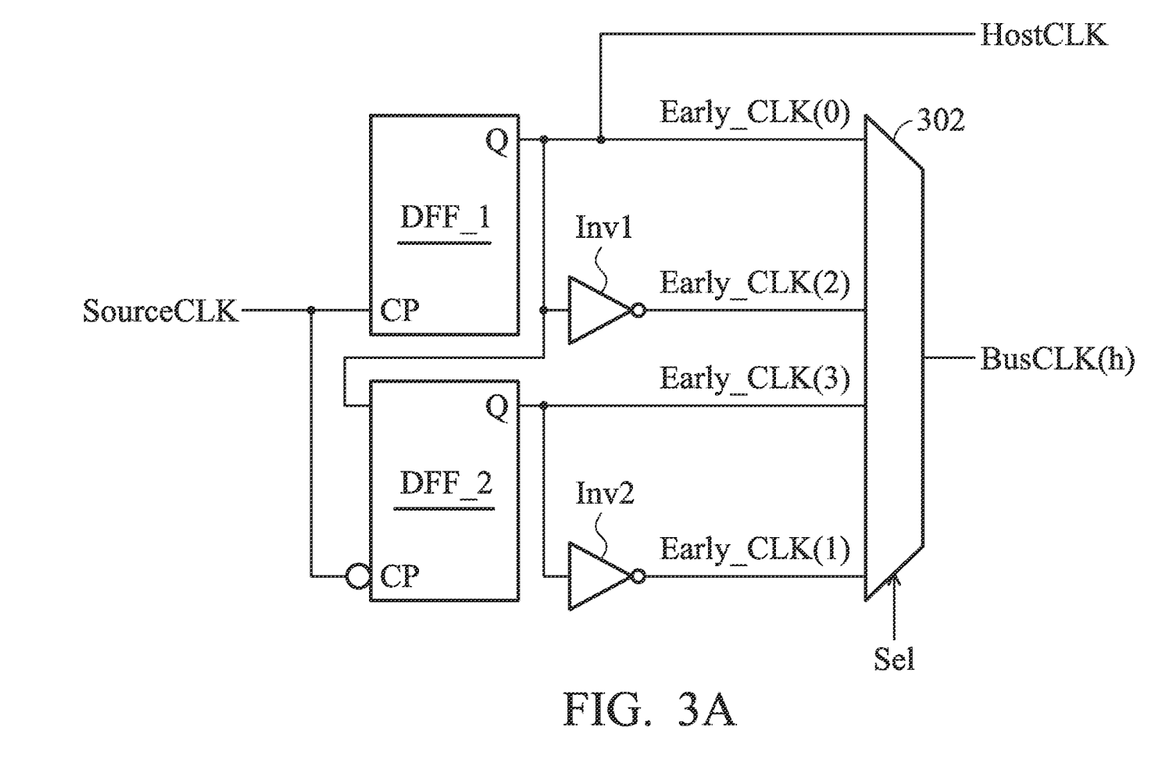
FIG. 3A shows how to generate a host clock signal HostCLK and a bus clock signal BusCLK(h) in accordance with an exemplary embodiment of the disclosure.
Figure 3B:
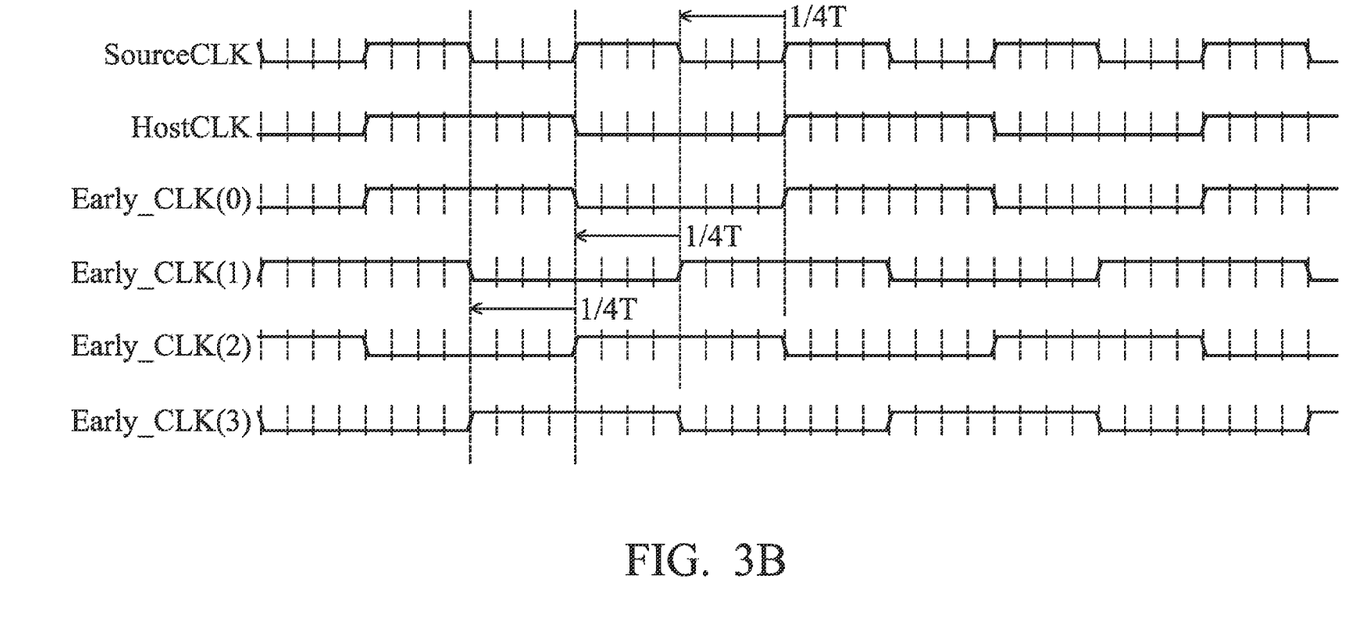
FIG. 3B depicts a waveform diagram corresponding to the circuit of FIG. 3A.

FIG. 3A shows how to generate the host clock signal HostCLK and the bus clock signal BusCLK(h) in accordance with an exemplary embodiment of the disclosure. FIG. 3B shows a waveform diagram with respect to the circuit of FIG. 3A.

Referring to FIG. 3A, the D-flip-flop DFF_1 uses a receiving terminal CP to receive a source clock signal SourceCLK and frequency divides the source clock signal SourceCLK to generate the host clock signal HostCLK (i.e. Early_CLK(0)) and uses an output terminal Q to output the host clock signal HostCLK. In FIG. 3A, another D-flip-flop DFF_2 and two inverters Inv1 and Inv2 and a multiplexer 302 are introduced to form the bus clock signal generator 104. The inverter Inv1 receives the host clock signal HostCLK. Referring to the receiving terminal CP of the D-flip-flop DFF_2, the D-flip-flop DFF_2 frequency divides the inverted signal of the source clock signal SourceCLK. The inverter Inv2 receives the output of the D-flip-flop DFF_2. Based on the architecture shown in FIG. 3A, the inverter Inv2 outputs a phase-shifted clock signal Early_CLK(1) that leads the host clock signal HostCLK by one quarter of a clock cycle (in the figure, T represents one clock cycle). The inverter Inv1 outputs a phase-shifted clock signal Early_CLK(2) that leads the host clock signal HostCLK by half a clock cycle. The D-flip-flop DFF_2 uses the output terminal Q to output a phase-shifted clock signal Early_CLK(3) that leads the host clock signal HostCLK by three quarters of one clock cycle. The multiplexer 302 receives the host clock signal HostCLK (i.e. Early_CLK(0)) and the aforementioned phase-shifted clock cycles Early_CLK(1), Early_CLK(2) and Early_CLK(3) and outputs one of the received signals as the bus clock signal BusCLK(h). The multiplexer 302 may operate in accordance with the phase shift control signal Sel.

Referring to FIG. 3B, the host clock signal HostCLK (i.e. Early_CLK(0)) is frequency-halved in comparison with the source clock signal SourceCLK. The phase-shifted clock signals Early_CLK(1) . . . Early_CLK(3) each provide one more quarter clock cycle to lead the phase of the host clock signal HostCLK (i.e. Early_CLK(0)).

Figure 4:
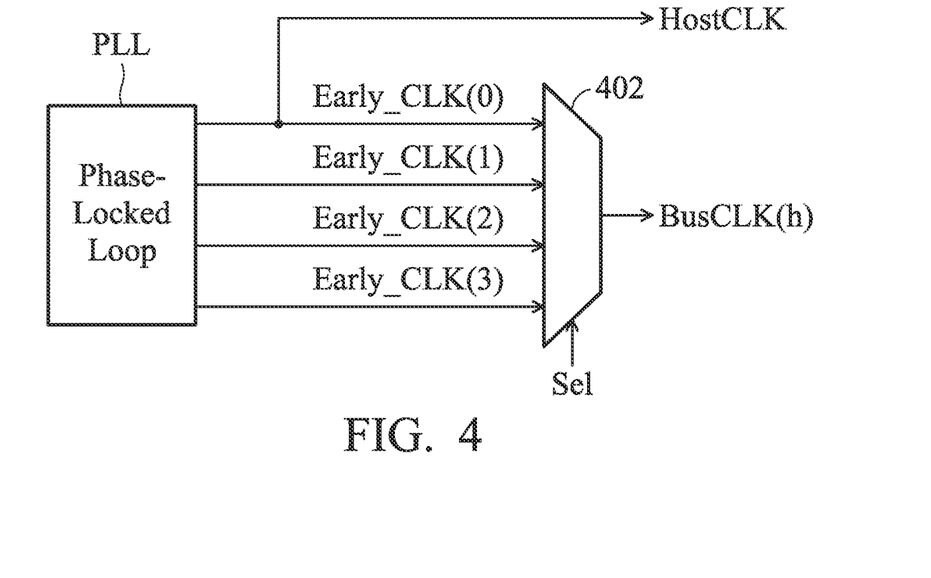
FIG. 4 shows how to generate a host clock signal HostCLK and a bus clock signal BusCLK(h) in accordance with another exemplary embodiment of the disclosure, which includes a phase-locked loop.

FIG. 4 shows another circuit for generation of the host clock signal HostCLK and the bus clock signal BusCLK(h), which includes a multiplexer 402 and a phase-locked loop PLL. In addition to the host clock signal HostCLK (i.e. Early_CLK(0)), the phase locked-loop PLL generates the phase-shifted clock signals Early_CLK(1), Early_CLK(2) and Early_CLK(3). The phase-shifted clock signal Early_CLK(1) leads the host clock signal HostCLK by one quarter of clock cycle. The phase-shifted clock signal Early_CLK(2) leads the host clock signal HostCLK by half a clock cycle. The phase-shifted clock signal Early_CLK(3) leads the host clock signal HostCLK by three quarters of a clock cycle. The multiplexer 402 receives the host clock signal HostCLK (i.e. Early_CLK(0)) and the phase-shifted clock signals Early_CLK(1), Early_CLK(2) and Early_CLK(3) and outputs one of the received clock signals as the bus clock signal BusCLK(h). The multiplexer 402 may operate in accordance with the phase shift control signal Sel.

Figure 5:
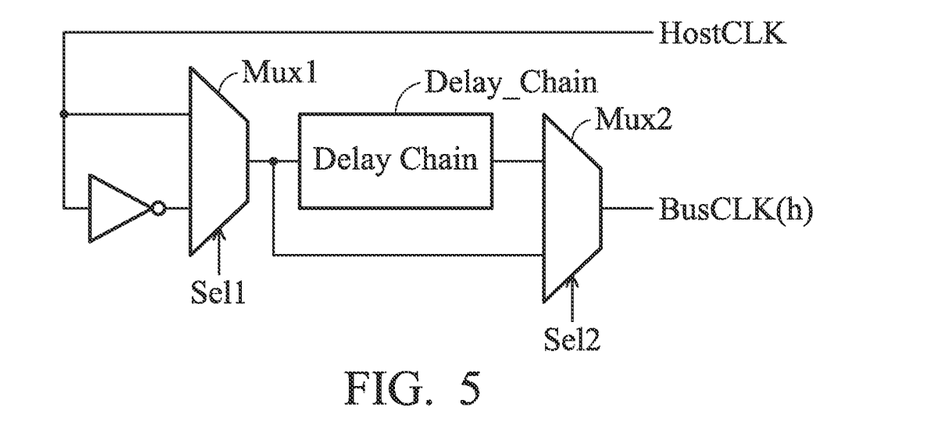
FIG. 5 shows how to generate a bus clock signal BusCLK(h) in accordance with an exemplary embodiment of the disclosure, which includes a delay chain.

FIG. 5 shows another architecture for generation of the bus clock signal BusCLK(h), which includes a delay chain. As shown in FIG. 5, a delay chain Delay_Chain and multiplexers Mux1 and Mux2 are used in the clock signal generator 104. The multiplexer Mux1 receives the host clock signal HostCLK and the inverted signal of the host clock signal HostCLK and selectively outputs one of the received signals. The delay chain Delay_Chain receives the output of the multiplexer Mux1. The multiplexer Mux2 receives the output of the delay chain Delay_Chain and the output of the multiplexer Mux1 and selectively outputs one of the received signals as the bus clock signal BusCLK(h). In this exemplary embodiment, signals Sel1 and Sel2 form the phase shift control signal Sel. Multiplexers Mux1 and Mux2 operate in accordance with signals Sel1 and Sel2, respectively.

In comparison with the small size of the delay chain Delay_Chain of FIG. 5, a circuit just using a long delay chain without the multiplexers Mux1 and Mux2 is also within the scope of the invention. The delay chain controls the delay of the host clock signal HostCLK for generation of the bus clock signal BusCLK(h).

Figure 6:
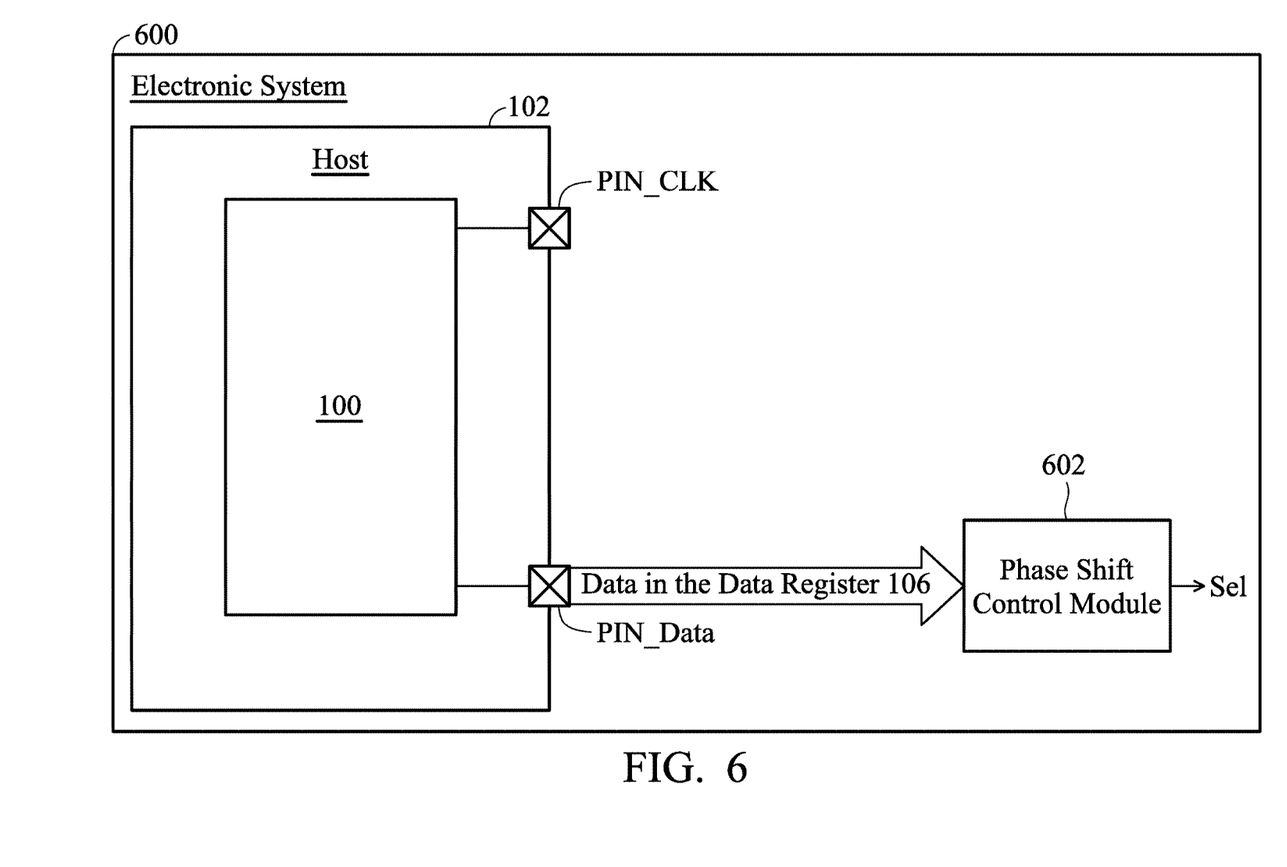
FIG. 6 depicts an electronic systems 600 in accordance with an exemplary embodiment of the disclosure.

FIG. 6 depicts an electronic system 600 in accordance with an exemplary embodiment of the disclosure, which includes a peripheral interface circuit 100 at host side and a phase shift control module 602. In an exemplary embodiment, the electronic system 600 may be a motherboard while the host 102 is a chipset. In other exemplary embodiments, the electronic system 600 is an SOC (System-On Chip). The phase shift control module 602 generates the phase shift control signal Sel for the bus clock signal generator 104 in the peripheral interface circuit 100 at host side to adjust the bus clock signal BusCLK(h). For simplicity, the connection between the host 102 and the peripheral device 110 that is clearly shown in FIG. 1 is omitted in FIG. 6. The phase shift control module 602 may include a computing unit and a BIOS memory and may be operated by using the computing unit to execute the code stored in the BIOS memory. In another exemplary embodiment, the phase shift control signal Sel is configured via strapping pins. When the host 102 side has not been booted up yet, the phase shift control signal Sel depends on the set of the strapping pins.

The phase shift control module 602 generates the phase control signal Sel based on a result of a clock tree synthesis (CTS) for the host clock signal HostCLK and the bus clock signal BusCLK(h). For the clock tree synthesis, the host clock signal HostCLK is regarded as the bus clock signal BusCLK(h) and is conveyed to the peripheral device 110 for the peripheral device 110 to output the data Data[N:0]. Based on how much time is required to receive the data Data[N:0] at the host 102 side after the host clock signal HostCLK is triggered, the bus clock signal BusCLK(h) is adjusted to advance how much phase lead there is over the host clock signal HostCLK to ensure that the host 102 side receives the data Data[N:0] within one clock cycle after the host clock signal HostCLK is triggered. Thus, a phase control signal Sel is determined. In an exemplary embodiment, the phase control signal Sel is stored in a software register, e.g., a BIOS register. When the host 102 side has not been powered on yet and has to be booted up in accordance with the data output from the peripheral device 110, the phase shift control signal Sel is configured via a plurality of strapping pins.

The aforementioned techniques may be used in a variety of peripheral device interfaces, including an LPC (Low Pin Count) interface, an SPI (Serial Peripheral Interface) bus, or a flash memory (e.g. SM or SD card) bus.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A peripheral interface circuit at host side, comprising:
a bus clock signal generator, outputting a bus clock signal based on a host clock signal and a phase shift control signal to be conveyed to a peripheral device via an interface bus as a reference for the peripheral device to output data, wherein the host clock signal and the phase shift control signal are input to the bus clock signal generator; and
a data register, receiving the data output from the peripheral device and retrieved at the host side in accordance with the host clock signal,
wherein:
the bus clock signal generator adjusts the bus clock signal based on how the host clock signal is phase-asynchronous to the data output from the peripheral device and retrieved at the host side in accordance with the host clock signal.

2. The peripheral interface circuit at host side as claimed in claim 1, wherein the bus clock signal generator adjusts the bus clock signal to make the data register receive the data output from the peripheral device and retrieved at the host side in accordance with the host clock signal within one clock cycle of the host clock signal.

3. The peripheral interface circuit at host side as claimed in claim 1, wherein the bus clock signal generator shifts a phase of the bus clock signal to be earlier than a phase of the host clock signal.

4. The peripheral interface circuit at host side as claimed in claim 1, wherein said asynchronous phase between the host clock signal and the data is due to a transmission delay, from the bus clock signal generator to the interface bus and then to the peripheral device, of the bus clock signal.

5. The peripheral interface circuit at host side as claimed in claim 1, wherein said asynchronous phase between the host clock signal and the data is due to a delay from the peripheral device receiving the bus clock signal to the peripheral device generating the data and another delay for transmission of the data from the peripheral device to the data register.

6. The peripheral interface circuit at host side as claimed in claim 1, wherein the bus clock signal generator selects one of the host clock signal and a plurality of phase-shifted clock signals generated from the host clock signal as the bus clock signal, wherein the phase-shifted clock signals each lead the host clock signal by k/N clock cycle, where k is a variable from 1 to (N−1).

7. The peripheral interface circuit at host side as claimed in claim 6, wherein N equals $2^n$ and n is a natural number.

8. The peripheral interface circuit at host side as claimed in claim 1, further comprising:
a first D-flip-flop, receiving a source clock signal and frequency dividing the source clock signal to generate the host clock signal.

9. The peripheral interface circuit at host side as claimed in claim 8, wherein the bus clock signal generator comprises:
a first inverter, receiving the host clock signal;
a second D-flip-flop, frequency dividing an inverted signal of the source clock signal in accordance with the host clock signal;
a second inverter, receiving an output signal of the second D-flip-flop; and
a multiplexer,
wherein:
the second inverter outputs a first phase-shifted clock signal that leads the host clock signal by one quarter of a clock cycle of the host clock signal;
the first inverter outputs a second phase-shifted clock signal that leads the host clock signal by half a clock cycle of the host clock signal;
the second D-flip-flop outputs a third phase-shifted clock signal that leads the host clock signal by three quarters of one clock cycle of the host clock signal; and
the multiplexer receives the host clock signal and the first, the second and the third phase-shifted clock signals and selectively outputs one of the host clock signal and the first, the second and the third phase-shifted clock signals as the bus clock signal.

10. The peripheral interface circuit at host side as claimed in claim 1, further comprising a multiplexer and a phase-locked loop, the phase-locked loop generating the host clock signal, wherein:
the phase-locked loop further generates a first phase-shifted clock signal, a second phase-shifted clock signal and a third phase-shifted clock signal;
the first phase-shifted clock signal leads the host clock signal by one quarter of a clock cycle of the host clock signal;
the second phase-shifted clock signal leads the host clock signal by half a clock cycle of the host clock signal;
the third phase-shifted clock signal leads the host clock signal by three quarters of one clock cycle of the host clock signal; and
the multiplexer receives the host clock signal and the first, the second and the third phase-shifted clock signals and selectively outputs one of the host clock signal and the first, the second and the third phase-shifted clock signals as the bus clock signal.

11. The peripheral interface circuit at host side as claimed in claim 1, wherein the bus clock signal generator comprises:
a delay chain, phase shifting the host clock signal to generate the bus clock signal.

12. An electronic system, comprising:
a host, comprising:
a bus clock signal generator, outputting a bus clock signal based on a host clock signal and a phase shift control signal to be conveyed to a peripheral device via an interface bus as a reference for the peripheral device to output data, wherein the host clock signal and the phase shift control signal are input to the bus clock signal generator; and
a data register, receiving the data output from the peripheral device and retrieved at the host side in accordance with the host clock signal,
wherein the bus clock signal generator adjusts the bus clock signal based on how the host clock signal is phase-asynchronous to the data output from the peripheral device and retrieved at the host side in accordance with the host clock signal; and
a phase shift control module, generating the phase shift control signal for the bus clock signal generator to adjust the bus clock signal.

13. The electronic system as claimed in claim 12, wherein the bus clock signal generator adjusts the bus clock signal to make the data register receive the data output from the peripheral device and retrieved at the host side in accordance with the host clock signal within one clock cycle of the host clock signal.

14. The electronic system as claimed in claim 12, wherein the bus clock signal generator shifts a phase of the bus clock signal to lead a phase of the host clock signal.

15. The electronic system as claimed in claim 12, wherein said asynchronous phase between the host clock signal and the data is due to a transmission delay, from the bus clock signal generator to the interface bus and then to the peripheral device, of the bus clock signal.

16. The electronic system as claimed in claim 12, wherein said asynchronous phase between the host clock signal and the data is due to a delay from the peripheral device receiving the bus clock signal to the peripheral device generating the data and another delay for transmission of the data from the peripheral device to the data register.

17. The electronic system as claimed in claim 12, wherein the bus clock signal generator selects one of the host clock signal and a plurality of phase-shifted clock signals generated from the host clock signal as the bus clock signal, wherein the phase-shifted clock signals each lead the host clock signal by k/N clock cycle, where k is a variable from 1 to (N−1), wherein N equals $2^n$ and n is a natural number.

18. The electronic system as claimed in claim 12, wherein the phase shift control module generates the phase shift control signal based on a clock tree synthesis for the host clock signal.

19. The electronic system as claimed in claim 12, wherein the phase shift control signal is stored in a software register.

20. The electronic system as claimed in claim 12, wherein the phase shift control signal is configured via a plurality of strapping pins.

* * * * *